United States Patent [19]

Reese

[11] Patent Number: 4,659,144

[45] Date of Patent: Apr. 21, 1987

[54] PORTABLE SUNSHIELD

[76] Inventor: Winfield L. Reese, 13 Longbow Ct., River Hills Plantation, Lake Wylie, S.C. 29710

[21] Appl. No.: 748,576

[22] Filed: Jun. 25, 1985

[51] Int. Cl.$^4$ .................................................. A47C 7/00
[52] U.S. Cl. ............................. 257/189; 160/349 R; 108/44; 5/498
[58] Field of Search ............... 247/189, 218, 219, 226, 247/220, 228, 229; 248/346; 108/43, 44; 5/417, 496, 498; 160/349 R

[56] References Cited

U.S. PATENT DOCUMENTS

| 1,298,550 | 3/1919 | Newell | 160/349 |
|---|---|---|---|
| 2,288,469 | 6/1942 | Lookholder | 297/219 |
| 2,980,169 | 4/1961 | Campbell | 297/184 X |
| 3,606,622 | 9/1971 | Williams et al. | 5/498 |
| 3,767,094 | 10/1973 | Sikes | 108/44 X |
| 3,818,970 | 6/1974 | Schmitz et al. | 160/349 |
| 4,118,066 | 10/1978 | Ricke | 297/184 |
| 4,142,570 | 3/1979 | Heimberg | 160/349 R |
| 4,359,004 | 11/1982 | Chappell | 108/44 |
| 4,458,738 | 7/1984 | Wilson | 297/219 X |

FOREIGN PATENT DOCUMENTS 2403103  8/1975  Fed. Rep. of Germany .......... 5/498

Primary Examiner—Peter A. Aschenbrenner
Attorney, Agent, or Firm—Bell, Seltzer, Park & Gibson

[57] ABSTRACT

A portable sunshield for selectively protecting front or rear interior portions of an automobile is provided which is characterized by its ability to be easily used without installing hardware or making other modifications to the automobile. The sunshield is readily adaptable to a variety of automobiles and includes a body formed of a generally rectangular sheet of opaque, pliable material and a pocket which extends widthwise of and is connected to the body. Distributable weighting means are contained in the pocket for providing a weighted pocket which holds the sunshield in place. The distribution of the distributable weighting means may be adjusted within the pocket to vary the sunshield's effective width and for facilitating the folding of the sunshield to provide a compact unit for storage, as under the seat of an automobile.

9 Claims, 19 Drawing Figures

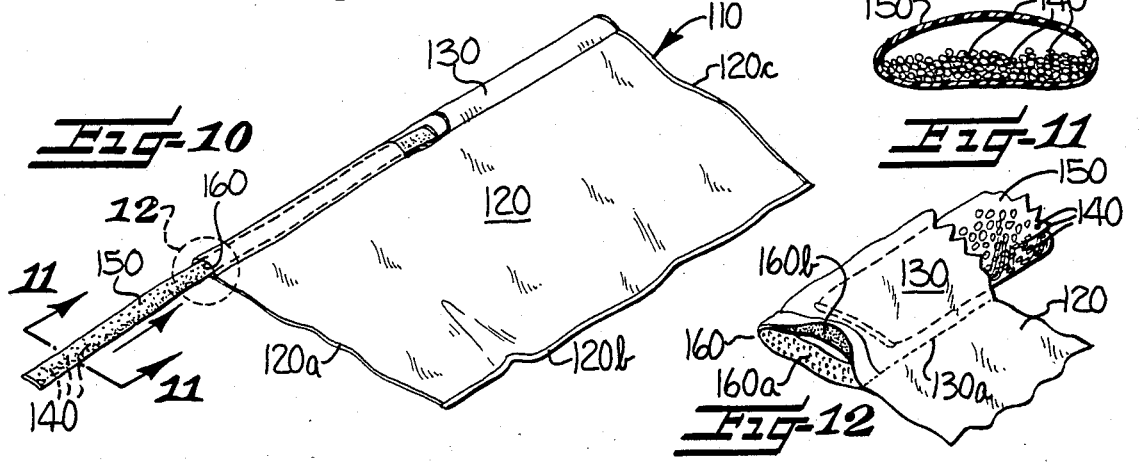

PORTABLE SUNSHIELD

BACKGROUND OF THE INVENTION

This invention relates to a portable sunshield which is particularly effective for use in protecting and preserving portions of automobile interiors. As the cost of automotive transportation has spiralled, so too have consumers become increasingly concerned with preserving and protecting their investments, and particularly the visual appearance of those vehicles which can drastically affect resale values. In a similar vein the high cost associated with purchasing a new automobile results in a need for many to retain their used automobile for greater periods of time. Accordingly, this class of automotive owner is also concerned with preserving the aesthetic as well as mechanical characteristics of the automobile in order to forestall the premature desire for a new vehicle due to fading of fabric colors or due to unsightly cracks in portions of the interior, and notably in the dash and rear deck portions which are generally extruded from plastic material.

Direct sunlight has long been the principal nemesis of automobile interiors, and in turn for the automobile owners who seek to preserve the value and quality of their cars or trucks. In order to combat the deteriorating effects of the sun, a plethora of potential solutions have been suggested over the years ranging from chemical formulations to physical screening devices. The chemical means, which have been particularly touted in commercial markets in recent years, require repeated periodic applications and are not suitable for fabric lined interior portions which are particularly susceptible to fading and discoloration over years of exposure.

Physical sunscreening devices for automotive interiors such as those described, for example, in U.S. Pat. Nos. 2,804,914 and 4,118,066 are mounted in the automobiles, generally under the seats, thereby requiring the provision of additional hardware and correspondingly limiting their flexibility. Moreover, these devices are adapted for use only on the seats of the vehicles and do not provide protection for the dash or rear deck surfaces which are particularly vulnerable areas requiring screening. Accordingly, the limitations associated with these constructions have prevented them from achieving commercialization.

It is therefore an object of the present invention to provide a sunshield which is portable so as to avoid the necessity for modifying the interior of an automobile or for providing auxiliary hardware. It is a further object of the invention to provide a sunshield construction which may be effectively used in preselected portions of the automobile interior, particularly on the dash and rear deck areas.

It is also an object of the invention to provide a sunshield construction which is adaptable to a wide range of automobile constructions ranging from compact to full-sized vehicles. It is an additional object of the invention to provide a sunshield which may be compactly folded for storage in the automobile when not in use.

SUMMARY OF THE INVENTION

As described further hereinbelow, the present invention overcomes the limitations associated with prior known devices by providing a sunshield which includes a body formed of a generally rectangular sheet of opaque pliable material for screening the potentially harmful rays of the sun and an elongate pocket connected to the body. In addition, distributable weighting means are positioned in the pocket so that the resulting weighted pocket may be conformably positioned on interior surfaces of an automobile, such as the dash, to effectively maintain the sunshield in place. Also, means are provided for closing the pocket to contain the distributable weighting means within the pocket.

The weighting means placed in the pocket, while sufficient to maintain the sunshield in place, is not so voluminous as to prevent the pocket from being folded one or more times for storage as under the front seat of an automobile, for example. In addition, when the distributable weighting means is granular, as in pellet form, which is preferred, the weighting means may essentially flow within the confines of the pocket. In this manner, the effective width of the sunshield may be adjusted by folding portions of the body and the pocket under the sunshield, to adapt it for use in automobiles of varying sizes.

The further numerous advantages and features of the invention will become apparent from the detailed description set forth below in connection with the drawings in which:

BRIEF DESCRIPTION OF THE DRAWINGS

FIG. 10 is a top perspective view of an alternative embodiment of the sunshield which includes an optional insert sleeve, containing the preferred granular weighting means, which is inserted in the pocket of the sunshield;

FIG. 11 is a cross-sectional view of the insert sleeve containing the granular weighting means taken along line 11—11 in FIG. 10;

FIG. 12 is a fragmentary exploded view of a portion of the sunshield within the area 12 of FIG. 10, and which illustrates one form of closing means for opening and reclosing the pocket of the sunshield;

FIG. 13 is a schematic view of the component elements of a kit for assembling a sunshield made in accordance with the invention;

FIG. 14 shows the kit in a compact package;

FIG. 15 is a schematic view depicting the filling of the insert sleeve with granular weighting means;

FIG. 16 is an exploded view of the sunshield with the insert sleeve having the granular weighting means therein readied for insertion into the pocket of the sunshield;

FIG. 17 is a top perspective view of another embodiment of the sunshield wherein the pocket of the sunshield is formed of constrasing color to the body; and FIGS. 18 and 19 are views of a still further embodiment illustrating the use of terry cloth fabric to form the body of the sunshield with non-terry fabric forming the pocket.

DETAILED DESCRIPTION OF THE PREFERRED EMBODIMENTS

Figure 3:
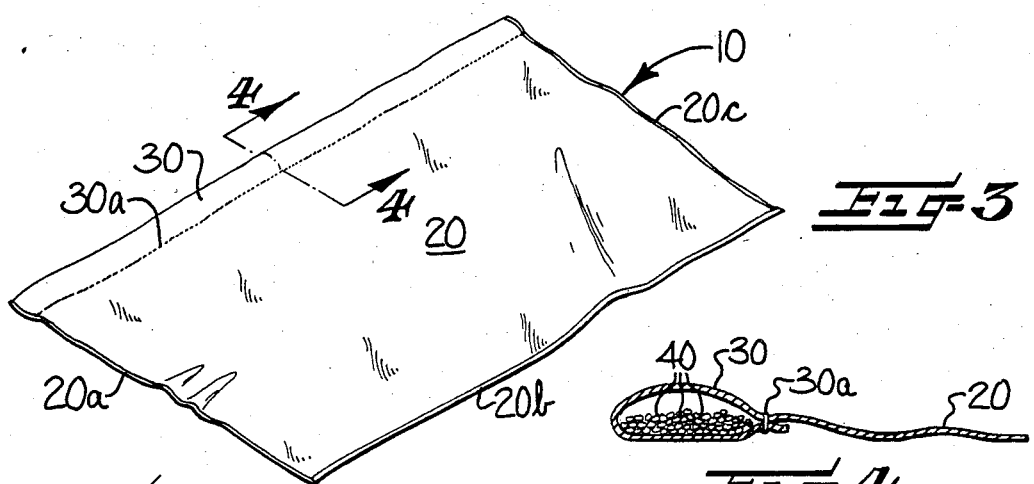
FIG. 3 is a top perspective view of the sunshield.
Figure 4:
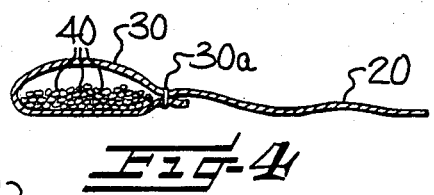
FIG. 4 is a cross-sectional view thereof taken along line 4—4 in FIG. 3 and showing the pocket with the preferred granular weighting means therein.

As best seen in FIG. 3, the novel sunshield 10 includes a body 20 formed of a generally rectangular sheet of opaque, pliable material and an elongate pocket 30 having a relatively small cross section, which is connected to the body. Distributable weighting means 40 are positioned in the pocket 30 to provide a weighted pocket which functions to hold the sunshield in position on the dash 8 or rear deck 9 of an automobile C, for example. Suitable means closing the pocket are also provided for containing the weighting means within the pocket 30.

The body 20 is preferably formed of a sheet of pliable material, which is preferably opaque and made of textile fabrics, but which may be of any other suitable material so long as it is effective for screening the rays of the sun and will not harm the interior of an automobile. The dimensions of the body 20 may be similarly varied, but preferably should extend a plurality of feet in each of its two principal directions and preferably about two feet in its lengthwise orientation. Also, the width of the body 20, and in turn the width of the sunshield 10, is preferably about twice the length of the sunshield 10. Thus a typical sunshield would have overall dimensions of about 4 to 5 feet in width and about $2\frac{1}{2}$ feet in length.

Figure 1:
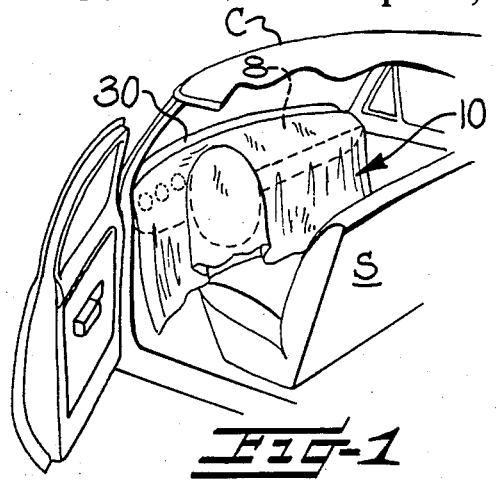
FIG. 1 is a schematic view of an automobile depicting a sunshield in accordance with the present invention protecting dash areas of the vehicle.

When the sunshield is positioned to overlie the dash 8 of an automobile C, for example, as shown in FIG. 1, a portion of the body 20 will preferably overlie the steering wheel of the automobile and the front face of the dash 8 to provide a complete shield from the rays of the sun. For use in mid-sized automobiles, for example, suitable dimensions for the body may be about 25 inches in length and about 56 inches in width (which corresponds to the approximate interior width of the automobile). In larger, full-sized automobiles the width dimension may be up to about six feet.

Figure 2:
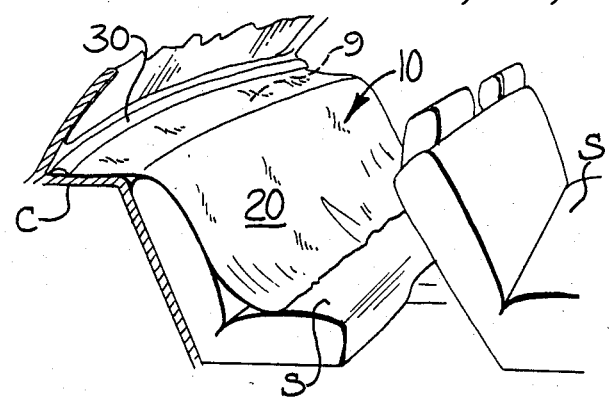
FIG. 2 is another schematic view of the rear interior portions of an automobile depicting a sunshield according to the present invention, protecting the rear deck areas thereof.

The sheet of material from which the body 20 is formed is preferably a textile fabric having a high coefficient of friction. Suitable fabrics include corduroy and terry cloth, the latter being preferably double-looped (FIG. 19) as in household towel constructions. Thus, if portions of the body 20 of the sunshield 10 extend over the seat S of an automobile C as shown in FIG. 2, where the pocket 30 is positioned on rear deck 9, or alternatively when the pocket 30 is positioned along the seat back, the body 20 will cooperate with the seat S (and particularly fabric seat coverings) to assist in maintaining the positioning of the sunshield 10 thereon. The sunshield 10 may include peripheral hemmed portions 20a, 20b, and 20c to enhance the overall appearance of the sunshield. A similar neat appearance may be achieved by a selvedge extending along the opposing sides of the body 20.

As noted above, the sunshield also includes a pocket 30 which may be separately or integrally formed with the body 20, so long as the pocket 30 and body 20 are connected in some fashion. The width of the pocket may of course be varied, but a width of three inches should be suitable in most applications. The sunshield embodiment 10 shown in FIG. 3, is fabricated from a single sheet of material. In this type of construction, the pocket 30 may be easily formed by folding the opaque sheet of material forming the body 20 on itself to provide a hem which may be secured by stitching 30a to provide a totally integrated construction for the sunshield 10.

Distributable weighting means are provided in the pocket 30 (FIG. 3) and may take on a variety of forms. The important characteristic for the weighting means is its ability to be distributed and redistributed within the pocket. Of particular suitability for purposes of the present invention are granular weighting means 40 which readily flow within the confines of the pocket 30 for easily conforming the pocket to the various internal configurations found in different automobiles. A particular preferred class of granular weighting means are thermoplastic pellets. Nonetheless, the weighting means 40 may consist of any suitable, preferably granular material such as sand or pebbles. In addition, the distributable weighting means may also include a plurality of interconnected links such as a length of chain (not shown). The particular weight selected for the weighting means positioned in the pocket 30 will likewise vary with, for example, the types of material(s) selected for construction of the sunshield and the coefficient of friction thereof. A suitable preferred weight of the weighting means is about two to three pounds. Where the weighting means are granular they should occupy about one-half and preferably about two-thirds of the volume of pocket 30 to facilitate folding of the sunshield as described below (see FIG. 5). Where the particular preferred thermoplastic pellets are utilized, they should be of the type which can withstand extended exposures to sunlight without losing the characteristics of a solid. Means closing the pocket are also provided for maintaining the weighting means within the confines of the pocket. In the embodiment shown in FIG. 3, this means comprises stitching, but as described more fully hereinbelow in connection with alternative embodiments of the invention, numerous alternatives are available for this purpose.

Figure 5:
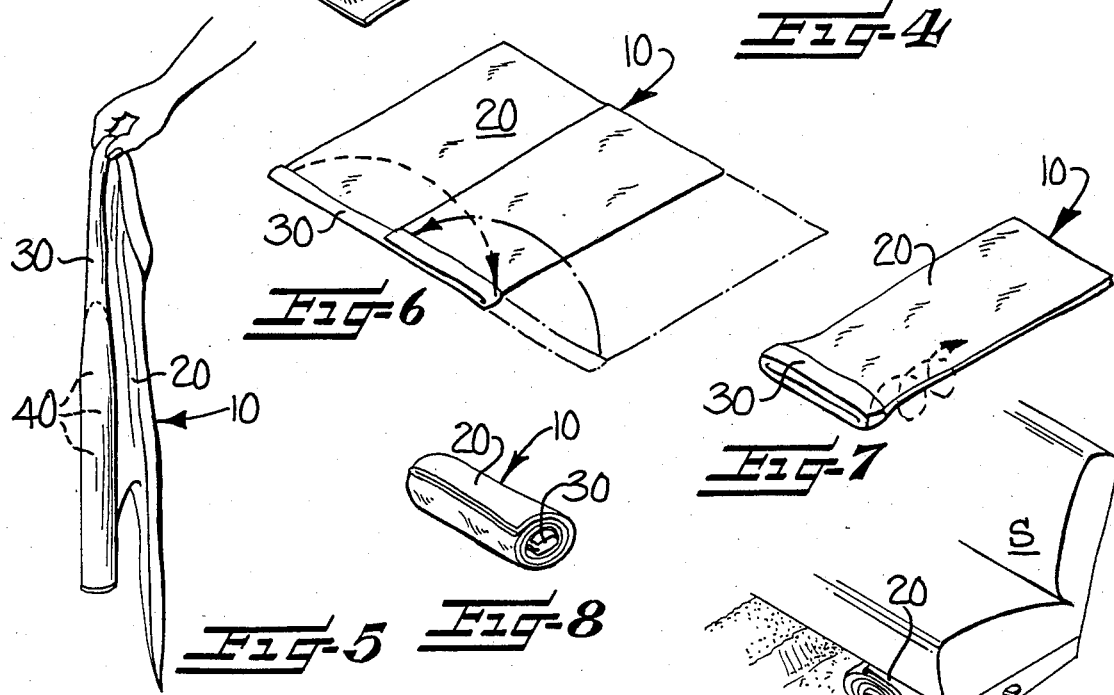
FIG. 5 is a schematic view of the sunshield to illustrate the drapable nature thereof and wherein the granular weighting means in the pocket has been concentrated for facilitating folding and storing of the sunshield in compact conditionn.
Figure 6:
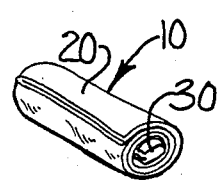
FIGS. 6, 7 and 8 are schematic views of the sunshield showing a typical folding sequence for compact storage thereof.
Figure 7:
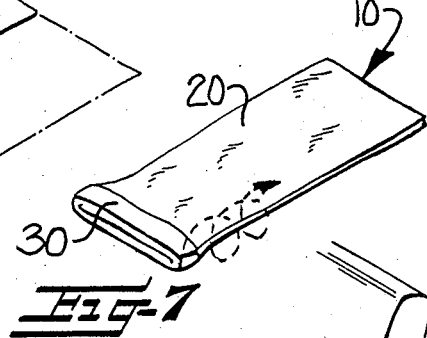
Figure 8:
Figure 9:
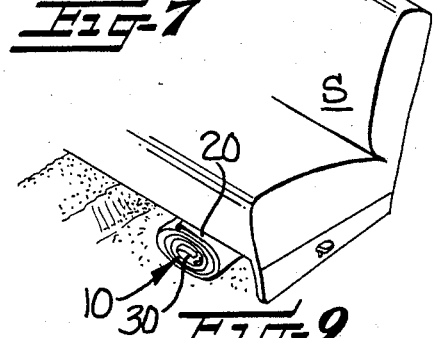
FIG. 9 is a schematic view of an automobile seat with the sunshield in compact, folded form stored thereunder.

As shown in FIGS. 5 through 9, the sunshield 10 may be easily folded for storage. FIG. 5 illustrates the flowability of the preferred granular weighting means 40 within the pocket 30, which facilitates the adjustment or folding of the sunshield by concentrating the material in one portion of the pocket. Thereafter, the sunshield 10 may be folded segmentally across its width (FIG. 6) to provide the configuration shown in FIG. 7. The sunshield thus folded may then be rolled along its lengthwise orientation as shown by the arrows in FIG. 7 to provide a compact unit (FIG. 8) for storage as under the seat S of an automobile, for example as shown in FIG. 9.

An alternative embodiment is shown in FIG. 10 with corresponding reference characters assigned to the corresponding elements of the embodiment shown in FIG. 3 with the number one hundred added thereto. The sunshield 110 thus comprises a body 120 formed of an opaque, pliable sheet of material and an elongate pocket 130. As shown further in FIG. 10, an optional insert sleeve 150 may be provided, and is in fact preferred especially where granular weighting means are used. The insert sleeve 150 may be fabricated from any material but preferably is made from plastic sheet material.

2. A sunshield according to claim 1 wherein said weighting means is granular and comprises discrete thermoplastic pellets.

3. A sunshield according to claim 1 wherein the width and length dimensions of said body are a plurality of several feet in each dimension and wherein said sheet of material has a high coefficient of friction to aid in maintaining the positioning of the sunshield on interior surfaces of an automobile.

4. A sunshield according to claim 1 including a hem extending along integral with one side of said body and defining said pocket for containing said weighting means therein whereby the pocket is integrally formed with said body.

5. A sunshield according to claim 1 wherein said body and said pocket are each formed of a separate sheet of textile fabric visually contrasting with each other.

6. A sunshield according to claim 1 wherein said weighting means has a total weight of about two to three pounds and wherein said means closing the pocket comprises stitching.

7. A sunshield according to claim 1 including an insert sleeve positioned in said pocket, said insert sleeve containing said weighting means therein, and wherein said means closing the pocket is readily openable and reclosable whereby the sleeve containing the weighting means may be removed from the pocket of the sunshield for facilitating laundering of the sunshield.

8. A sunshield according to claim 7 wherein said means closing the pocket comprises a plurality of hook means and cooperating fabric hook receiving means for readily opening and reclosing said pocket.

9. A sunshield according to claim 7 wherein said insert sleeve is formed of plastic sheet material.

* * * * *